US008990311B2

(12) United States Patent  
Chen et al.

(10) Patent No.: US 8,990,311 B2
(45) Date of Patent: Mar. 24, 2015

(54) ENHANCED INSTANT MESSAGE CONNECTIVITY (75) Inventors: Yen-Fu Chen, Austin, TX (US); Rick A. Hamilton, II, Charlottesville, VA (US); James W. Seaman, Falls Church, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 2353 days.

(21) Appl. No.: 10/900,795

(22) Filed: Jul. 27, 2004

(65) Prior Publication Data

US 2006/0026239 A1 Feb. 2, 2006

(51) Int. Cl.
G06F 15/16 (2006.01)
H04L 12/58 (2006.01)
H04L 29/08 (2006.01)

(52) U.S. Cl.
CPC ............. *H04L 12/581* (2013.01); *H04L 51/04* (2013.01); *H04L 67/24* (2013.01)
USPC ........................... 709/206; 709/204; 709/217

(58) Field of Classification Search
CPC ................................................... H04L 12/581
USPC ............ 709/203, 206, 218, 227, 207; 710/62
See application file for complete search history.

(56) References Cited

U.S. PATENT DOCUMENTS

| | | | | |
|---|---|---|---|---|
| 6,289,212 B1 * | 9/2001 | Stein et al. | ............ | 455/412.1 |
| 6,661,799 B1 * | 12/2003 | Molitor | ............ | 370/401 |
| 7,136,945 B2 * | 11/2006 | Gibbs et al. | ............ | 710/62 |
| 7,233,589 B2 * | 6/2007 | Tanigawa et al. | ............ | 370/352 |
| 7,266,583 B2 * | 9/2007 | Fitzpatrick et al. | ............ | 709/205 |
| 2002/0178087 A1 | 11/2002 | Henderson et al. | ............ | 705/26 |
| 2003/0037112 A1 | 2/2003 | Fitzpatrick et al. | ............ | 709/205 |
| 2003/0045272 A1 * | 3/2003 | Burr | ............ | 455/411 |
| 2003/0065721 A1 * | 4/2003 | Roskind | ............ | 709/204 |
| 2003/0083046 A1 * | 5/2003 | Mathis | ............ | 455/412 |
| 2003/0093482 A1 | 5/2003 | Watanabe et al. | ............ | 709/206 |
| 2003/0101343 A1 | 5/2003 | Eaton et al. | ............ | 713/170 |
| 2003/0112823 A1 * | 6/2003 | Collins et al. | ............ | 370/474 |
| 2003/0126213 A1 * | 7/2003 | Betzler | ............ | 709/206 |
| 2003/0131061 A1 | 7/2003 | Newton et al. | ............ | 709/206 |
| 2003/0154398 A1 * | 8/2003 | Eaton et al. | ............ | 713/201 |
| 2003/0177184 A1 * | 9/2003 | Dickerman et al. | ............ | 709/204 |
| 2003/0182428 A1 | 9/2003 | Li et al. | ............ | 709/227 |
| 2004/0249953 A1 * | 12/2004 | Fernandez et al. | ............ | 709/227 |
| 2004/0268265 A1 * | 12/2004 | Berger | ............ | 715/752 |
| 2005/0059418 A1 * | 3/2005 | Northcutt | ............ | 455/517 |
| 2005/0060377 A1 * | 3/2005 | Lo et al. | ............ | 709/206 |
| 2007/0214259 A1 * | 9/2007 | Ahmed et al. | ............ | 709/224 |

* cited by examiner

*Primary Examiner* — Hee Soo Kim
(74) *Attorney, Agent, or Firm* — Noah A. Sharkan (57) ABSTRACT

Connection state information for Instant Message (IM) users is collected and stored by an IM client. Connection state information for everyone in a sender's buddy list is replicated and stored by the sender's IM client. The IM clients are updated as updates are made on the IM server. This enables simplified direct connection between IM clients when the IM server is down. Client-to-client IM searches are performable, wherein a search is transparently initiated against entries in the user's buddy list, i.e., the user's client directly contacts each available buddy in the user's buddy list using the stored connection state information of the buddy(ies), and it then queries the connection state information of all of the entries in their buddy list(s). For times when a user is not actively on-line, a listener service can be enabled at boot time for the user's PC or laptop computer.

27 Claims, 8 Drawing Sheets

ENHANCED INSTANT MESSAGE CONNECTIVITY

BACKGROUND OF THE INVENTION

1. Field of the Invention

The present invention relates to a computer system and, more particularly, to a method, system, and computer program product for enhancing the availability of instant messaging.

2. Description of the Related Art

Instant messaging systems provide for instant, real-time communication between users who are connected to the system through an on-line or electronic networking environment. Examples of instant messaging systems include Yahoo! Messenger, AOL Instant Messenger, and Lotus Sametime. Such systems are becoming quite popular among users of networks such as the Internet, World Wide Web (hereinafter "web"), and internal intranets because they are easy to use and provide a simple way for one user to send a message to another user.

Instant messaging systems provide real-time awareness of who is logged on. Typically, an instant messaging system (hereinafter "IMS") user has an address book or "buddy list" containing names and/or nicknames for those people with whom he or she communicates. The entries in this address book are used for selecting a message recipient. The IMS typically indicates, using a visual cue (such as different icons or different fonts), which of the people are logged on to the system and which are not. For a message to be sent from a sending user to a receiving user, typically both users must be logged on to an IMS (which may be the same IMS, or a different IMS).

With message applications becoming more prevalent in a society that demands real-time communication methods, the need to ensure maximum availability for these applications has become paramount. Many businesses now incorporate IMS's into their "repertoire" of business communication tools, and employees of such businesses have come to rely on the ability to communicate, via computer, on a real-time basis, and to be able to "leave messages" on the desktop computer of an absent recipient such that when the recipient returns, the recipient may immediately respond, and, if the sender is available, have an immediate dialog.

Typical IMS's utilize a message infrastructure that depends upon a centralized IM server to act as the "traffic cop", that is, directing the messages from the sender to the recipient and overall coordination of the IM session. If the central server is not available, the sender's message has no way of knowing how to get to its intended destination.

The coordination function operates as follows. When any IM client connects to the IM server, the server obtains "connection state information" (also referred to as "CSI") for the client that is connecting to the IM server. Typically this involves performing a network look-up of the IP address of the connecting IM client. For that instant messaging session, the IM server knows how to route traffic for that particular IM client. When an IM client (the sender) sends a message to another IM client (the recipient), the message is routed through the IM server. The IM server then sends the message to the recipient using the communications state information that the IM server looked up and maintains.

The connection state information is temporarily stored by the IM server during the chat session, that is, the IM server only keeps it available for that IM chat session. As soon as the user logs off (or shuts down the IM client) the connection state information is lost. In addition, as described above, where the IM server is unavailable, IM clients cannot connect to the IM server to send or receive messages. To increase the availability of IM servers generally, expensive clustering solutions (i.e., the shared use of multiple servers) can be utilized, thereby increasing the availability of alternate servers when a primary server is not functioning. However, this level of redundancy increases costs and requires more maintenance, etc.

Peer-to-peer networks exist whereby, if a sender knows, in advance, the IP address of a recipient, the sender can directly connect to the recipient and bypass the IM server altogether. This functions adequately; however, it requires that participants in the IM session know ahead of time, and manually input, the IP address of the party(s) to which they desire to connect. This is inconvenient and requires significant administrative action on the part of users of the system to maintain IP addresses for people with whom they wish to communicate. The problem becomes even more complex because many users may access their computers from multiple locations (e.g., work, home, on the road, etc.) and thus have multiple IP addresses associated with their on-line sessions.

Accordingly, it would be desirable to have a simple, user-friendly way to identify, access, and store connection state information of IM users with little or no reliance on an IM server to search for and use the connection state information for communicating between IM users.

SUMMARY OF THE INVENTION

The present invention enhances the availability of the overall IM infrastructure. In accordance with one embodiment the present invention, connection state information for users is collected and stored by an IM client. The IM server keeps track of each user individually in a known manner (e.g., a basic flat file database), but the connection state information for everyone in a sender's buddy list is replicated and stored by the sender's IM client. As updates are made to the connection state information on the IM server, the IM clients are also updated. This enables simplified direct connection between IM clients when the IM server is down.

In accordance with an alternative embodiment, when the IM server is down (or if no IM server is available), and an IM user wants to contact a new recipient for whom connection state information is not stored on the user's IM client, client-to-client IM searches are performable, wherein a search is transparently initiated against entries in the user's buddy list, i.e., the user's client directly contacts each available buddy in the user's buddy list using the stored connection state information of the buddy(ies), and it then queries the connection state information of all of the entries in their buddy list(s). This continues until a match is found. The user's local buddy list is updated to include the connection state information for the new recipient(s) and a message can then be sent to the new recipient(s).

In an additional embodiment, for times when a user is not actively on-line, a listener service can be enabled at boot time for the user's PC or laptop computer. Thus, a real-time connection with the server would not be required to communicate with another user, thereby maintaining real-time messaging by bypassing the typical client/server messaging infrastructure.

DETAILED DESCRIPTION OF THE PREFERRED EMBODIMENTS

In this document, the term "connection state information" is defined generally as any information usable to institute a peer-to-peer connection between IM clients. For example, connection state information includes screen names (including GECOS and/or RACF), IP address(es) from which a connection is made, hostnames (if applicable) from which a connection is made, and/or port numbers used (including port numbers used in lieu of default port numbers).

Figure 1:
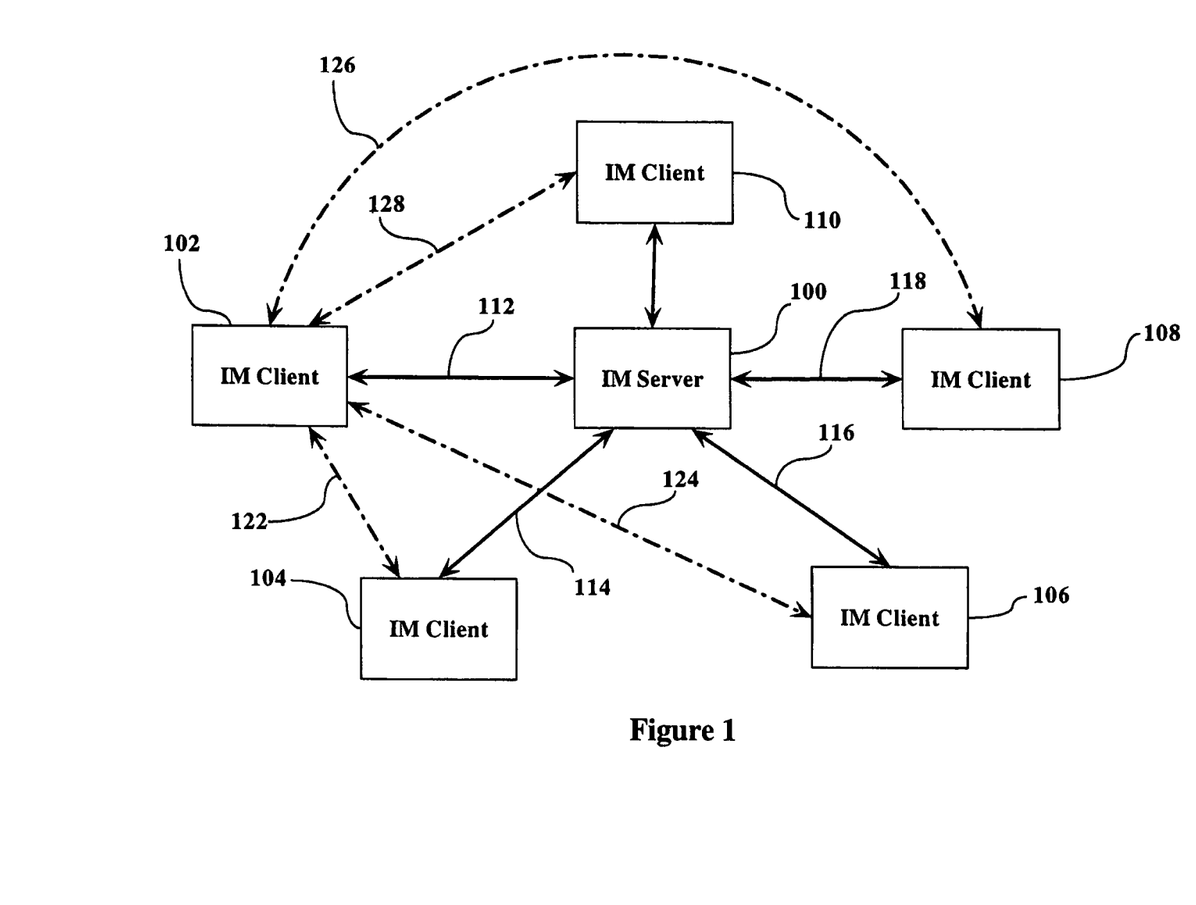
FIG. 1 illustrates a typical IM environment and connection methods between IM clients within that environment.

The present invention is now described with reference to FIGS. 1-7. FIG. 1 illustrates a typical IM environment and connection methods between IM clients within that environment. Referring to FIG. 1, an IM server 100 serves as the central routing point for instant messages between IM clients 102, 104, 106, 108, and 110. In a typical IM environment, each client has a two-way connection with IM server 100. For example, IM client 102 connects to IM server 100 via connection 112, IM client 104 connects to IM server 100 via connection 114, IM client 106 connects to IM server 100 via connection 116, IM client 108 connects to IM server 100 via connection 118, and IM client 110 connects to IM server 100 via connection 120.

In the prior art, it is known that IM clients can connect to each other while bypassing the IM server 100 if the sending IM client knows the IP address of the receiving IM client; this would be a typical peer-to-peer connection between the IM clients. For example, if IM client 102 knows the IP addresses of all of the other IM clients 104, 106, 108, and 110 in FIG. 1, then IM client 102 can connect directly to these clients, as illustrated by dotted-lined paths 122, 124, 126, and 128, respectively. As noted above, a problem exists because typically these IP addresses are unknown to the users of the IM clients and the IM clients themselves do not maintain records of the IP addresses of other IM clients with which they have communicated. Further, there is no known method of looking up IP addresses for situations where IM client 102, for example, wishes to communicate with an IM client that it has never communicated with in the past.

Figure 2:
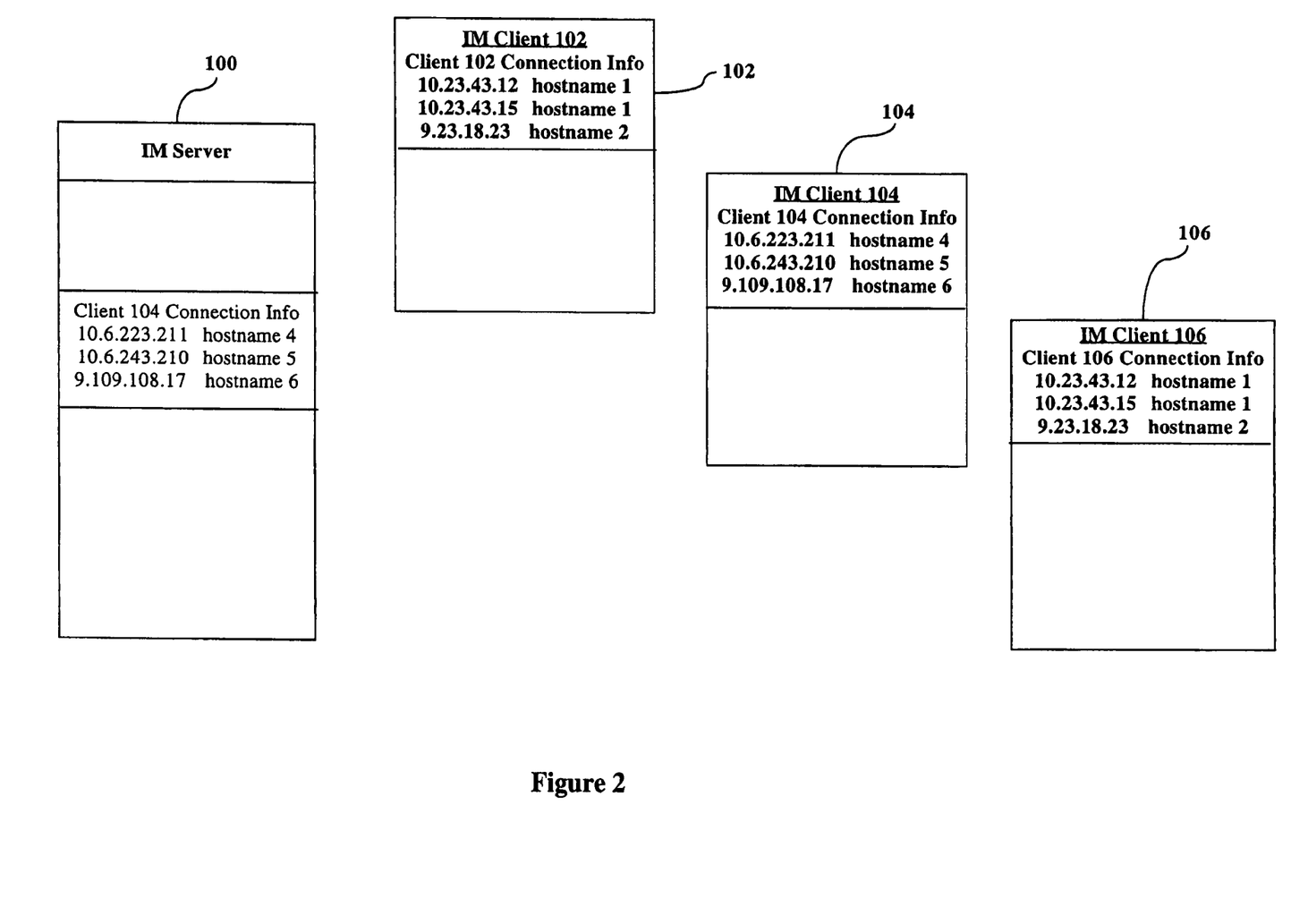
FIGS. 2-7 are state drawings illustrating various states of an IM system comprising an IM server and multiple IM clients.

FIG. 2 is a state drawing illustrating an IM system of the prior art comprising IM server 100, and IM clients 102, 104, and 106. Each client and the IM server is configured to include storage for storing connection state information of other users with which they have been in contact. The state illustrated in FIG. 2 shows three clients who have never communicated among each other, and server 100, which has communicated with IM client 104 previously. As can be seen in FIG. 2, IM server 100 has retained the connection state information for IM client 104 ("client 104 connection information"). In accordance with the present invention, whenever a client contacts an IM server, its connection state information is stored on the server for access by other clients. In the state shown in FIG. 2, no clients are connected to IM server 100.

The connection state information for each IM client is shown in bold text. As can be seen in FIG. 2, each IM client has multiple connection state information entries, in this example, IP addresses and host names. Each host name corresponds to a particular device used by a user of each IM client. For example, referring to IM client 102, hostname 1 is associated with two different IP addresses, namely, 10.23.43.12 and 10.23.43.15. In addition, a second host name, hostname 2, is associated with IP address 9.23.18.23. Hostname 1, for example, can be a laptop computer used by a user of IM client 1 at a work location (IP address 10.23.43.12) as well as at a remote location (10.23.43.15). Hostname 2 can be, for example, a workstation at a home location that communicates via IP address 9.23.18.23. Obviously the user may have more or less devices and/or IP addresses that they use in connection with IM client 1. For example, a user with a single home computer will likely have a single host name with a single IP address.

Figure 3:
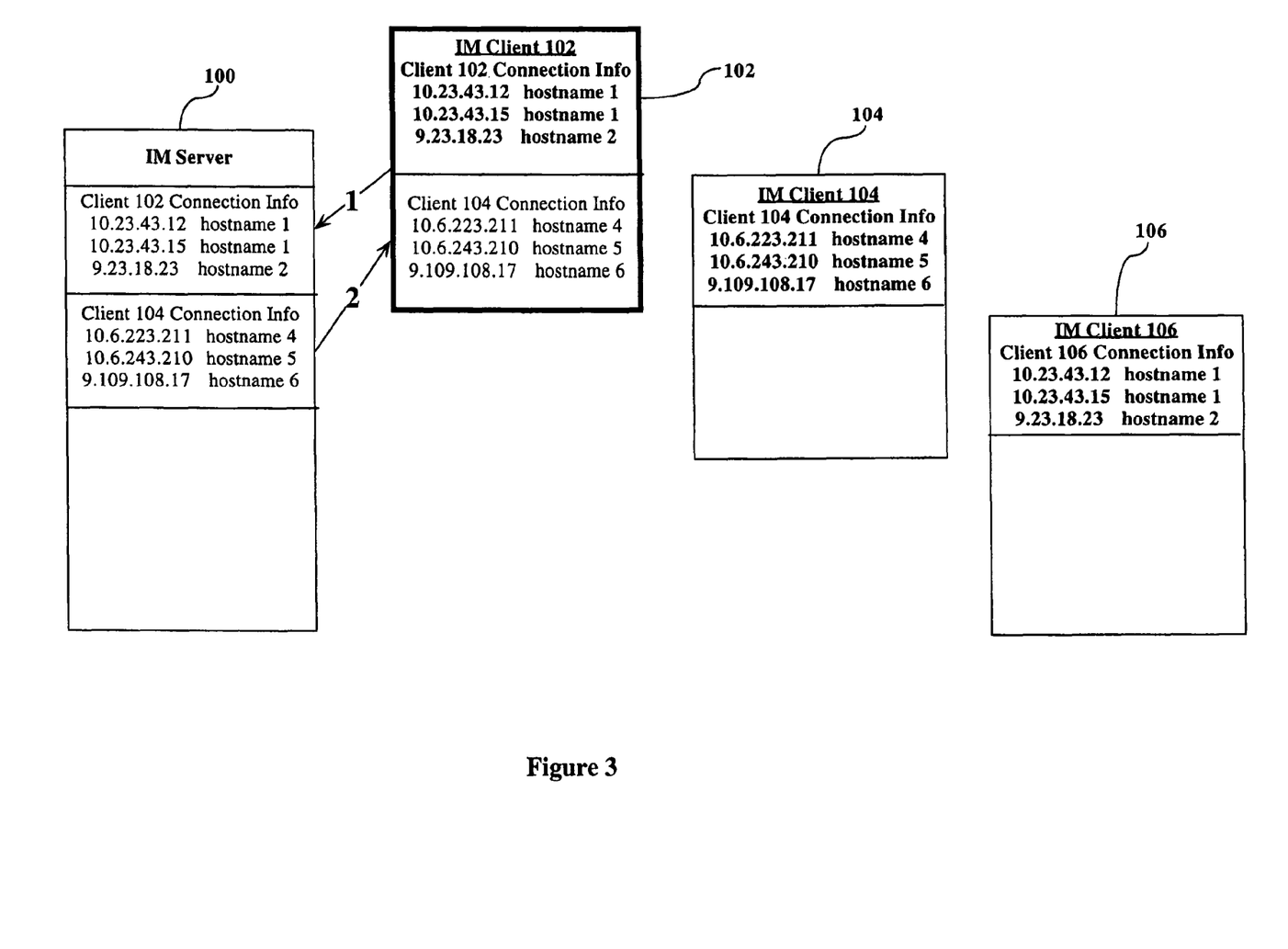

FIG. 3 illustrates a state in which IM client 102 logs on to IM server 100, illustrated by arrow 1 extending from IM client 102 to IM server 100. In connection with this log-on process, IM client 102's connection state information is transferred to IM server 100. Thus, IM server 100 now stores data relating to, in this example, three IP addresses used by IM client 102. All IP addresses ever used by IM client 102 can be transferred; in a preferred embodiment, only the most recently used IP addresses, e.g., the last three, for example, are transferred and stored on IM server 100. As part of the log-on process, IM server 100 sends back to IM client 102 any connection state information for other clients who have utilized IM server 100 in the past. This is illustrated by arrow 2, showing the copying of the client 104 connection state information from IM server 100 to IM client 102. Now, in this state, IM client 102 has the necessary information to directly contact IM client 104, assuming that IM client 104 is still using any one of the three IP addresses stored on IM server 100.

Figure 4:
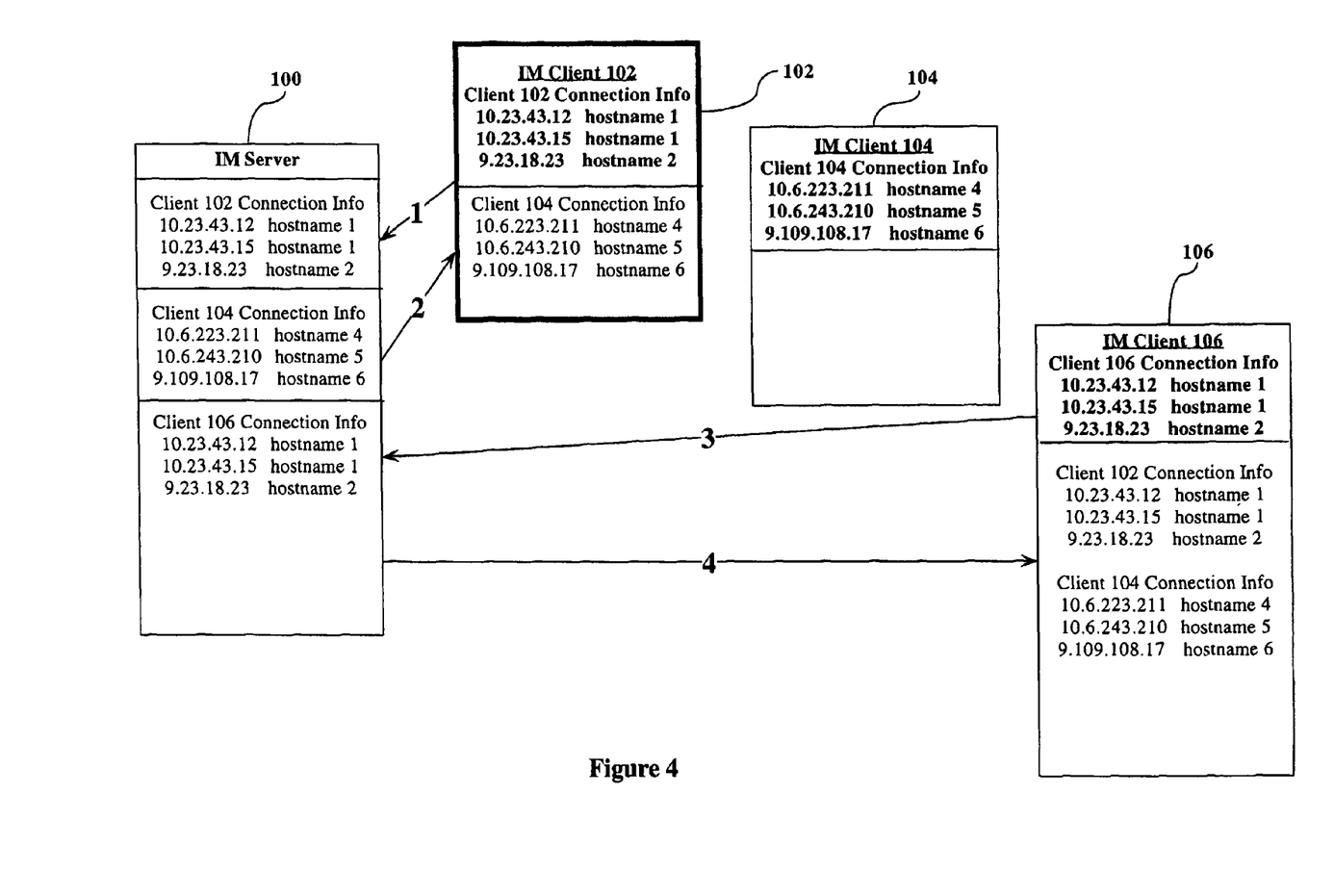

FIG. 4 illustrates the connection of IM client 106 to IM server 100. As shown by arrow 3, IM client 106 connects to IM server 100 and in doing so transfers its connection state information to IM server 100. In response to the connection, IM client 106 obtains all other connection state information stored on IM server 100 which, in this example, includes connection state information for IM clients 102 and 104. Although not shown in FIG. 4, in one embodiment of the present invention, whenever new information is stored on IM server 100, it can automatically be transmitted to all connected IM clients; thus, connection information for IM client 106 would be immediately transferred to IM client 102 as well as to IM client 106 (but not to client 104, since it is not currently connected to server 100).

Figure 5:
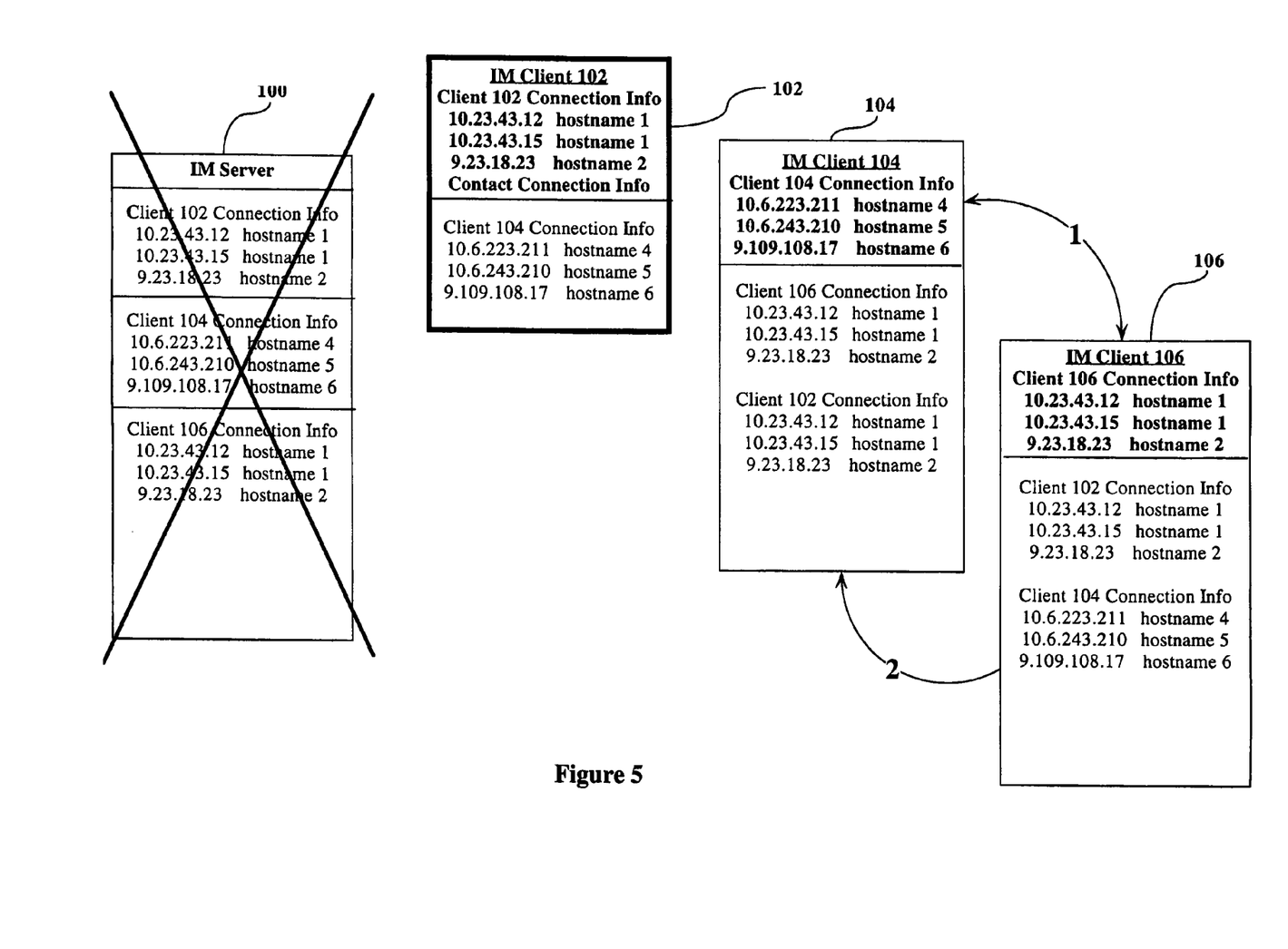

FIG. 5 illustrates a situation where IM server 100 fails. As shown in FIG. 5, there are now no connections between any of the IM clients 102, 104, or 106 and the IM server 100. IM client 106 is able to connect to IM client 104 (illustrated by arrow 1 in FIG. 5) because IM client 106 obtained IM client 104's connection state information from IM server 100 before IM server 100 failed. In addition, if desired, the connection state information stored in IM client 106 can be automatically, or upon request, transmitted to IM client 104, as illustrated by arrow 2. Thus, as a result of the connection between IM client 106 and IM client 104, IM client 104 now has the connection state information for both IM client 102 and IM client 106.

Figure 6:
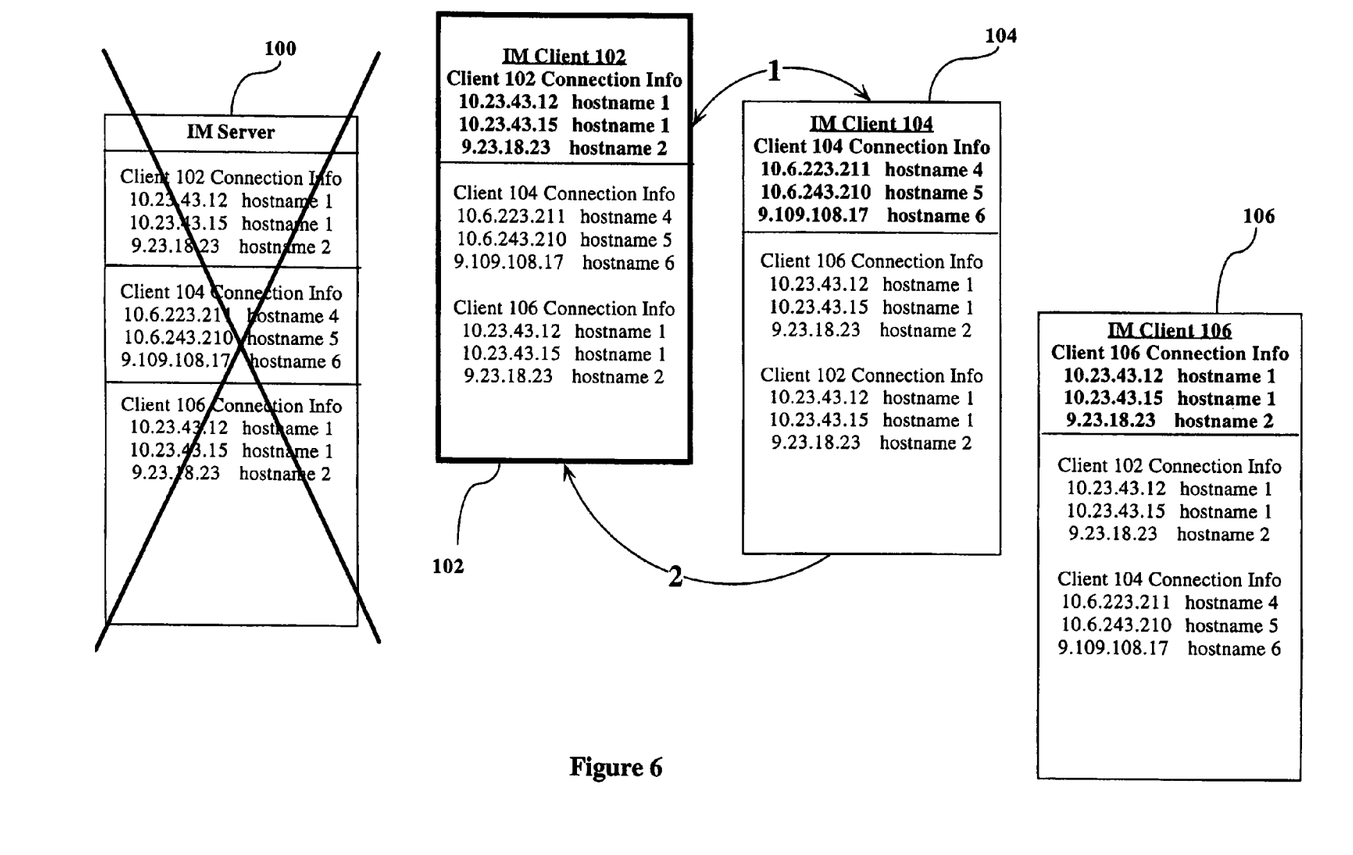
Figure 7:
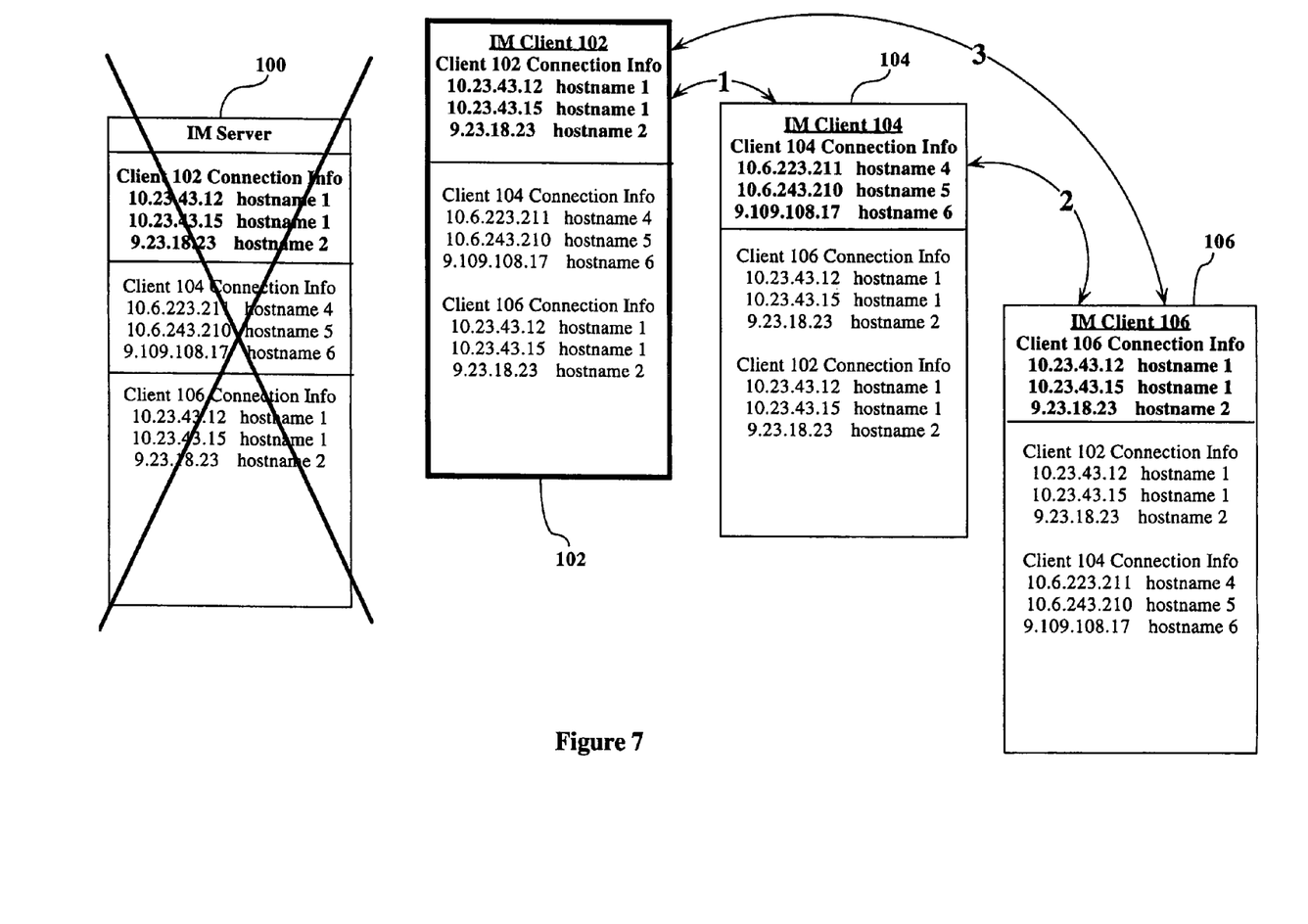

FIG. 6 illustrates a connection between IM client 104 and IM client 102. Prior to the connection information transfer that occurred in FIG. 5, IM client 104 did not have the information needed to contact IM client 102. However, with this information now stored in IM client 104, IM client 104 can make the connection illustrated by arrow 1 with IM client 102. Again, as discussed previously, this connection also enables IM client 102 to obtain connection state information stored in IM client 104 (arrow 2). Thus, as shown in FIG. 7, all three IM clients have connection information for each other, and they are able to directly connect with each other, without the need to use IM server 100 (connections between clients illustrated by arrow 1, 2, and 3).

Figure 8:
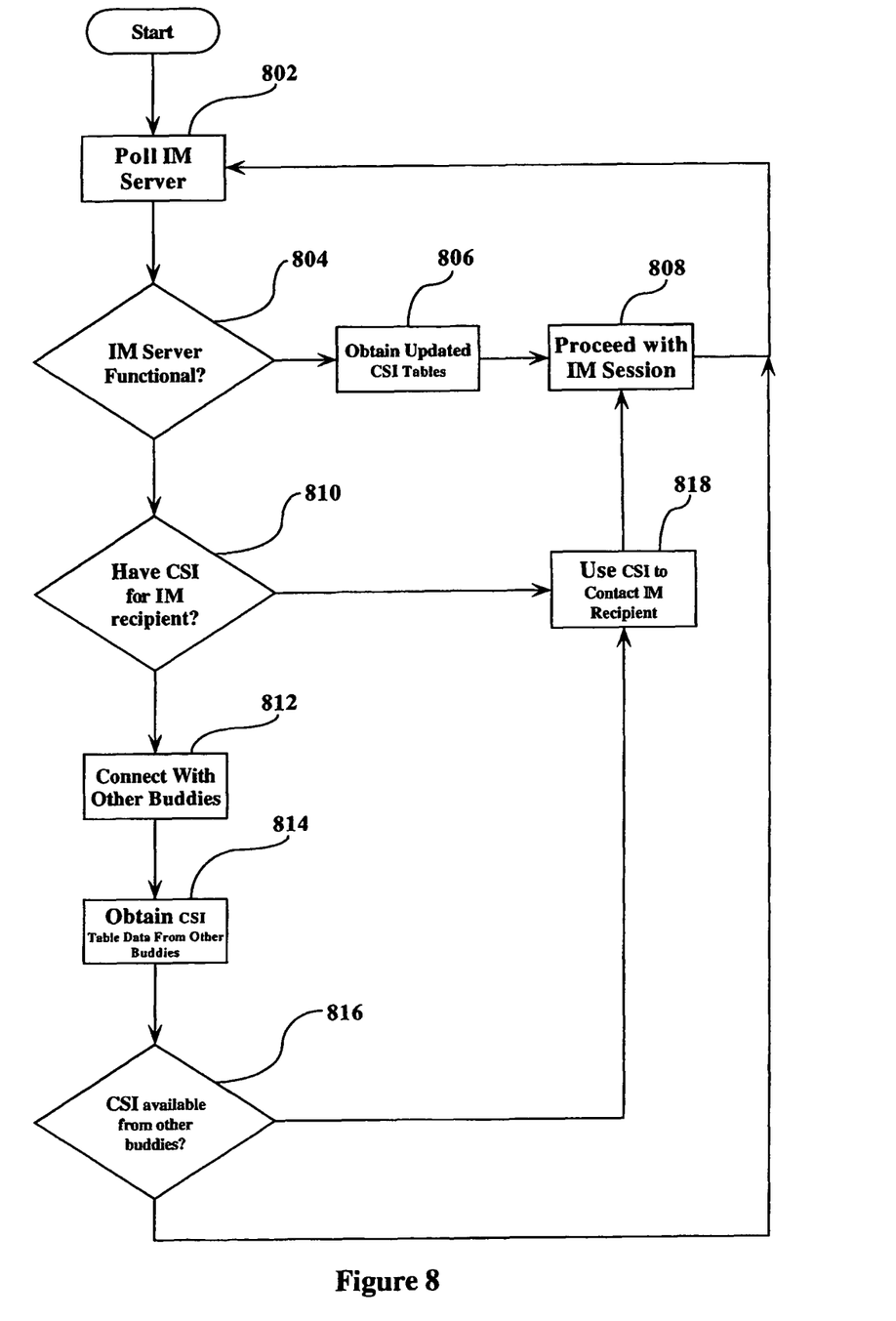
FIG. 8 is a flowchart illustrating an example of a series of steps performed in an embodiment of the present invention.

FIG. 8 is a flowchart illustrating a basic series of steps performed in accordance with an embodiment of the present invention. This flowchart describes the basic process involved where a user of a particular IM client (the IM sender) wishes to commence an IM session with a user of another IM client (the IM recipient). Referring to FIG. 8, at step 802, the IM server is polled by the sending client to determine its status (functioning or non-functioning). In a preferred embodiment this polling process is automatic and is performed on a regular basis to enable ths system to be able to toggle back and forth between server connections and direct connections, depending upon the state of the server.

At step 804, if it is determined that the server is functioning, then at step 806, updated CSI table information is obtained from the server and stored by the client of the IM sender. This is an optional step, but if used, assures that the IM sender has the most current CSI information available.

At step 808, since the IM server is functional, the IM sender can commence an IM session, using the IM server to coordinate the session in the usual manner. The process proceeds back to step 802, where, upon the next polling interval, the IM server is polled again as described above.

If, at step 804, it is determined that the IM server is NOT functional, the process proceeds to step 810, where it determined if the IM sender already has CSI data for the IM recipient with whom it wished to commence an IM session. If the IM sender already has the CSI data for the IM recipient, then the process proceeds to step 818 and the CSI data is used to make the IM connection, and then the process moves to step 808, where the IM session is commenced. Since the server is non-functional, the IM sender uses the CSI of the IM recipient to make a direct connection to the IM recipient and commence the IM session. The process then goes back to polling step 802.

If the IM sender does NOT have CSI data for the IM recipient, the process proceeds to step 812, where the IM sender connects with other buddies on its IM list (and for whom it has CSI data), and at step 814 the IM sender obtains CSI data from the other buddies that it does not already have. At step 816, with the new CSI information obtained from other buddies, the IM sender determines if it now has CSI data for the IM recipient. If the IM sender does now have the CSI data for the IM recipient, then the process proceeds to step 818, where the CSI is used to contact the IM recipient and then the process proceeds to step 808, where the IM session commences. As can be seen, the polling process continues, as described above.

The concept of local client storage of connection state information presents multiple enhancements to the availability of the overall instant message infrastructure. In the embodiment described above, the connection state information for users is collected on the IM server and the IM client. The IM server keeps track of each user individually, but the connection state information for all possible recipients in a sender's buddy list is replicated to the sender's IM client. As updates are made to the connection state information on the IM server, the IM client is updated. This updating process can be performed upon start up of the IM client, or scheduled as desired. Thus, messages to a particular recipient can be sent directly to the recipient and not through the IM server. This decreases the IM server overhead and lowers the dependency that the IM client has on the IM server. In situations where the IM server is down, the IM clients can still communicate with one another.

Alternatively, in the event that the IM server is down, and the user wants to contact a new recipient (one that is not currently in his or her buddy list), the sender will need the connection information for that new recipient. In this embodiment, the IM client can do IM client searches, wherein a search is initiated against all of the users in the sender's buddy list, and each buddy is contacted and their buddy list entries are queried to look at the connection state information of their buddies. This process, whereby the users in the sender's buddy list are searched, and then their buddy lists are searched, and then their buddy lists are searched, etc., is referred to generically as "spidering", and can continue until a match is found. The sender's local buddy list is updated with the connection state information of the new buddy and a message can then be sent to that new buddy.

In another embodiment, in cases where an IM client is not online, a listener service can be enabled (e.g., upon booting up the user's PC or laptop computer). In this embodiment, the IM client is modified to run as a daemon (UNIX, LINUX) or service (Windows) where the listener is always active. Thus, searches queued from other IM clients for connection state information involve no additional "work" on the part of the non-active IM client. Since the listener service is always enabled (e.g., at boot time), the search capability is always active, even if the IM client is not. In the event that the user has not logged into the IM server, he/she could still receive a message from another sender and a simple prompt will be displayed asking the user to initiate communication, as the current art provides.

The present invention provides multiple advantages and distinctive elements. For example, an automatic connection switching feature can be implemented. In this implementation, a configurable option is provided for the user to select the preferred mode of connection/look-up, either IM server connection/look-up or direct client connection/look-up. In a typical implementation the default would be to use the IM server for connection/look-up, and in the event that the IM client loses communication with IM server, it would automatically toggle to the direct client connection/look-up mode, using the replicated buddy list and the associated stored connection state information to perform the look-up task that the IM server normally would perform. The client is configured to poll for the status of the IM server, and upon detection of a functioning IM server, the system can be toggled back to IM server connection/look-up mode. This method of connection switching runs in the background and is transparent to user so user can focus on their IM activities.

As noted above, the connection state information can include port information and can also include firewall information for each client. For example, a port number used by the recipient can be stored as part of the client state information, thus providing a way to bypass a firewall blockage. If a sending client is attempting to contact a receiving client using port 4567 of the receiving client, and port 4567 is blocked by a firewall, then based on connection state information for the receiving client indicating port 80 as a valid port, the sending client can instead transmit to the receiving client via port 80 to get through receiving client's firewall, and still receive a response on port 4567. This same technique can be used to a perform look-up on IM client machines situated behind a router.

The present invention can also provide dynamic IP mapping/look-up capability. With many people working from home or connecting to networks using DHCP, resolving dynamic IP issues may be needed. During initialization of the IM client, the client can be configured to determine the current IP address being used and update the latest connection state information to the IM server and/or directly to other clients using the unique buddy ID as the look-up name in the table storing the connection state information. When a sending client starts a chat session with a buddy, the sending client will already have the latest IP information for client-to-client look-up and can establish the connection directly.

The present invention also can include a distributed Buddy List System, where a buddy list (in a client data file) is saved in multiple locations. In a case where a user is attempting to contact buddies from a different machine, upon completing installation of the IM client (or if IM client is already installed), the user can configure the client to a URL and automatically extract buddy connection information from any locations listed in the configuration, or the user can supply the data from a diskette or CD. This convenience factor allows a user to connect from any installation of the client and not be restricted to one machine, similar to the behavior of a web browser.

Searches can be performed based on the order of servers listed. The user can store the buddy connection data file on an IM server, mail account server, or even on other buddy machines. The same location list (typically servers) can be used to upload buddy connection data at a frequency time interval configured by the user.

As described above, the present invention includes buddy-to-buddy "hop search" functionality, whereby a user A can connect to a user B's buddy list (on user B's machine) to find connection information for a user C. It is understood that in a practical embodiment, user A would have to have sufficient access privileges in order to do the look-up, and user A would likely have to be provided with appropriate permissions to be allowed to connect to user C. To accomplish this in a secure manner, user relationships, access permissions, and location reference information can be encrypted and stored in the same data repository as that of the connection state information. If desired, an administrative GUI can be provided to assist a user with managing the client data file.

It is contemplated that the present invention can be packaged as a plug-in to work with existing IMS's such as Yahoo, AOL, MSN, Trillion, and Sametime.

The IM client of the present invention can also be integrated with message auto-saving and purging capabilities where messages are saved as a user type; thus, during network or system outages the message will be persistent and delivered when the machine returns to a functioning environment. This feature can be a user-configurable parameter, since the purpose of IM is to deliver the message at the instant the user completes typing and hits the "send" button, and it may not be desirable to some users to enable this "delayed sending" feature.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a device on which an IM client is running. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1-8 support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A method for initiating instant messaging (IM) between plural clients when disconnected from a IM server, each of said clients having a buddy list, said method comprising:
for each client, permanently storing connection state information (CSI) of each buddy in its respective buddy list;
searching a first client's buddy list to determine whether a target client is in the first client's buddy list;
responsive to determining that the target client is not in the first client's buddy list, the first client connecting in a direct connection mode to a second client in the first client's buddy list and determining whether the target client is in the second client's buddy list;
responsive to determining that the target client is not in the second client's buddy list, the first client connecting in a direct connection mode to a third client in the second client's buddy list and determining whether the target client is in the third client's buddy list;
responsive to determining that the target client is in the second client's buddy list, copying CSI for the target client from the second client's buddy list and storing the copied CSI for the target client in the first client's buddy list;
responsive to determining that the target client is in the third client's buddy list, copying CSI for the target client from the third client's buddy list and storing the copied CSI for the target client in the first client's buddy list; and
the first client using copied CSI for the target client stored in the first client's buddy list to connect in a direct connection mode to the target client for an IM session.

2. The method of claim 1, wherein in a server mode, said clients connect to an IM server to facilitate IM sessions between each other.

3. The method of claim 2, wherein said IM server stores CSI of all clients connecting to said IM server, and wherein said CSI stored on said IM server is copied to the buddy list of any client connecting to said IM server.

4. The method of claim 3, wherein each client polls said IM server when attempting to initiate an IM session, and if said IM server is functional, initiating said IM session in said server mode and if said IM server is non-functional, initiating said IM session in said direct connection mode.

5. The method claim 4, wherein for each client, said CSI comprises one or more IP addresses used thereby.

6. The method of claim 5, wherein for each client, said CSI comprises the three most recently-used IP addresses used thereby.

7. The method of claim 1, wherein said storing of said CSI in said buddy list of each client comprises copying the CSI stored in the buddy list of one client to any of said other clients connecting to said one client in said direct connection mode.

8. The method of claim 1, further comprising:
activating a listening service associated with one or more of said clients, whereby said listening service is active regardless of the active or inactive state of its associated client, and whereby the CSI stored in the buddy list of the associated client is accessible to other of said clients when said listening service is activated.

9. The method of claim 8, wherein said listening service can be activated upon boot-up of a machine on which said listening service resides.

10. A system for initiating instant messaging (IM) between plural clients when disconnected from an IM server, each of said clients having a buddy list, said system comprising:
a plurality of clients, each client comprising memory and one or more processors configured to:
permanently store connection state information (CSI) of each buddy in its respective buddy list;
search a first client's buddy list to determine whether a target client is in the first client's buddy list;
responsive to determining that the target client is not in the first client's buddy list, connect the first client in a direct connection mode to a second client in the first client's buddy list and determine whether the target client is in the second client's buddy list;
responsive to determining that the target client is not in the second client's buddy list, connect the first client in a direct connection mode to a third client in the second client's buddy list and determine whether the target client is in the third client's buddy list;
responsive to determining that the target client is in the second client's buddy list, copy CSI for the target client from the second client's buddy list and store the copied CSI for the target client in the first client's buddy list;
responsive to determining that the target client is in the third client's buddy list, copy CSI for the target client from the third client's buddy list and store the copied CSI for the target client in the first client's buddy list; and
use copied CSI for the target client stored in the first client's buddy list to connect the first client in a direct connection mode to the target client for an IM session.

11. The system of claim 10, wherein in a server mode, said clients connect to an IM server to facilitate IM sessions between each other.

12. The system of claim 11, wherein said IM server stores CSI of all clients connecting to said IM server, and wherein said CSI stored on said IM server is copied to the buddy list of any client connecting to said IM server.

13. The system of claim 12, wherein each client polls said IM server when attempting to initiate an IM session, and if said IM server is functional, initiating said IM session in said server mode and if said IM server is non-functional, initiating said IM session in said direct connection mode.

14. The system claim 13, wherein for each client, said CSI comprises one or more IP addresses used thereby.

15. The system of claim 14, wherein for each client, said CSI comprises the three most recently-used IP addresses used thereby.

16. The system of claim 10, wherein said means for storing said CSI in said buddy list of each client comprises:
means for copying the CSI stored in the buddy list of one client to any of said other clients connecting to said one client in said direct connection mode.

17. The system of claim 10, further comprising wherein each client comprises memory and one or more processors further configured to:
activate a listening service associated with one or more of said clients, whereby said listening service is active regardless of the active or inactive state of its associated client, and whereby the CSI stored in the buddy list of the associated client is accessible to other of said clients when said listening service is activated.

18. The system of claim 17, wherein said listening service can be activated upon boot-up of a machine on which said listening service resides.

19. A computer program product for initiating instant messaging (IM) between plural clients when disconnected from a IM server, each of said clients having a buddy list, said computer program product comprising a non-transitory computer-readable storage medium having an executable computer-readable program stored thereon, the program instructing a processor to perform the following steps:
for each client, permanently storing connection state information (CSI) of each buddy in its respective buddy list;
searching a first client's buddy list to determine whether a target client is in the first client's buddy list;
responsive to determining that the target client is not in the first client's buddy list, the first client connecting in a direct connection mode to a second client in the first client's buddy list and determining whether the target client is in the second client's buddy list;
responsive to determining that the target client is not in the second client's buddy list, the first client connecting in a direct connection mode to a third client in the second client's buddy list and determining whether the target client is in the third client's buddy list;
responsive to determining that the target client is in the second client's buddy list, copying CSI for the target client from the second client's buddy list and storing the copied CSI for the target client in the first client's buddy list;
responsive to determining that the target client is in the third client's buddy list, copying CSI for the target client from the third client's buddy list and storing the copied CSI for the target client in the first client's buddy list; and
the first client using copied CSI for the target client stored in the first client's buddy list to connect in a direct connection mode to the target client for an IM session.

20. The computer program product of claim 19, wherein in a server mode, said clients connect to an IM server to facilitate IM sessions between each other.

21. The computer program product of claim 20, wherein said IM server stores CSI of all clients connecting to said IM server, and wherein said CSI stored on said IM server is copied to the buddy list of any client connecting to said IM server.

22. The computer program product of claim 21, wherein each client polls said IM server when attempting to initiate an IM session, and if said IM server is functional, initiating said IM session in said server mode and if said IM server is non-functional, initiating said IM session in said direct connection mode.

23. The computer program product claim 22, wherein for each client, said CSI comprises one or more IP addresses used thereby.

24. The computer program product of claim 23, wherein for each client, said CSI comprises the three most recently-used IP addresses used thereby.

25. The computer program product of claim 19, wherein said computer-readable program code that stores said CSI in said buddy list of said client comprises:
   computer-readable program code for copying the CSI stored in the buddy list of one client to any of said other clients connecting to said one client in said direct connection mode.

26. The computer program product of claim 19, further comprising:
   computer-readable program code that activates a listening service associated with one or more of said clients, whereby said listening service is active regardless of the active or inactive state of its associated client, and whereby the CSI stored in the buddy list of the associated client is accessible to other of said clients when said listening service is activated.

27. The computer program product of claim 26, wherein said listening service can be activated upon boot-up of a machine on which said listening service resides.

* * * * *